United States Patent
Park et al.

(10) Patent No.: US 8,045,587 B2
(45) Date of Patent: Oct. 25, 2011

(54) APPARATUS FOR RECONSTRUCTING CONTROL MESSAGE, APPARATUS FOR RESTORING CONTROL MESSAGE, METHOD OF RECONSTRUCTING CONTROL MESSAGE, AND METHOD OF RESTORING CONTROL MESSAGE

(75) Inventors: Chul Park, Daejeon (KR); Chul-Sik Yoon, Seoul (KR)

(73) Assignees: Electronics and Telecommunications Research Institute, Daejeon (KR); Samsung Electronics Co., Ltd., Seoul (KR)

( * ) Notice: Subject to any disclaimer, the term of this patent is extended or adjusted under 35 U.S.C. 154(b) by 124 days.

(21) Appl. No.: 12/516,572

(22) PCT Filed: Oct. 24, 2007

(86) PCT No.: PCT/KR2007/005254
§ 371 (c)(1),
(2), (4) Date: May 28, 2009

(87) PCT Pub. No.: WO2008/066252
PCT Pub. Date: Jun. 5, 2008

(65) Prior Publication Data
US 2010/0091797 A1    Apr. 15, 2010

(30) Foreign Application Priority Data

Dec. 1, 2006 (KR) .......................... 10-2006-0120746
Jun. 12, 2007 (KR) .......................... 10-2007-0057185

(51) Int. Cl.
*H04J 3/24* (2006.01)
(52) U.S. Cl. ........................................ 370/474; 370/477
(58) Field of Classification Search .................. 370/474, 370/476, 477, 470, 472; 375/240.01–240.29
See application file for complete search history.

(56) References Cited

U.S. PATENT DOCUMENTS 6,493,342 B1 * 12/2002 Breslow et al. ............... 370/394
7,817,639 B2 * 10/2010 Breslow et al. ............ 370/395.2
(Continued)

FOREIGN PATENT DOCUMENTS
WO    2006/079932 A2    8/2006
(Continued)

OTHER PUBLICATIONS

IEEE Std 802.16-2004, IEEE Standard for Local and Metropolitan Area Networks—Part 16: Air Interface for Fixed Broadband Wireless Access Systems, Oct. 1, 2004.
(Continued)

Primary Examiner — Gary Mui
(74) Attorney, Agent, or Firm — Jefferson IP Law, LLP (57) ABSTRACT

The present invention relates to an apparatus for reconstructing a control message, an apparatus for restoring a control message, a method of reconstructing a control message, and a method of restoring a control message. To this end, an exemplary embodiment of the present invention provides an apparatus for reconstructing a control message, the apparatus including an index parameter generating section that classifies a plurality of first parameters in a control message according to a predetermined criterion to generate group information and generates one or more index parameters corresponding to the group information, and a control message reconstructing section that reconstructs the control message on the basis of the group information and the index parameters. According to the present invention, the size of a control message to be transmitted and received between a base station and a terminal can be reduced, thereby providing more additional services to the terminal through a limited radio resource.

17 Claims, 7 Drawing Sheets

U.S. PATENT DOCUMENTS

| | | |
|---|---|---|
| 2005/0107036 A1 | 5/2005 | Song et al. |
| 2005/0159163 A1 | 7/2005 | Chang et al. |
| 2005/0197123 A1 | 9/2005 | Chang et al. |
| 2005/0207408 A1* | 9/2005 | Elliott .......................... 370/389 |
| 2005/0243776 A1 | 11/2005 | Kawabata et al. |
| 2009/0147804 A1* | 6/2009 | Wang et al. ................... 370/476 |

FOREIGN PATENT DOCUMENTS

| | | |
|---|---|---|
| WO | 2006/100411 A1 | 9/2006 |

OTHER PUBLICATIONS

IEEE Std P802.16e-2005 and IEEE Std P802.16-2004/Cor1-2005, IEEE Standard for Local and Metropolitan Area Networks—Part 16: Air Interface for Fixed and Mobile Broadband Wireless Access Systems—Amendment 2: Physical and Medium Access Control Layers for Combined Fixed and Mobile Operation in Licensed Bands and Corrigendum 1, Feb. 28, 2006.

* cited by examiner

| Field | Type | Length | Value |
|---|---|---|---|
| First Fixed Parameter | X | — | — |
| Second Fixed Parameter | X | — | — |
| ⋮ | ⋮ | ⋮ | ⋮ |
| N-th Fixed Parameter | | — | — |
| First TLV Parameter | — | — | — |
| Second TLV Parameter | — | — | — |
| ⋮ | ⋮ | ⋮ | ⋮ |
| M-th TLV Parameter | — | — | — |

APPARATUS FOR RECONSTRUCTING CONTROL MESSAGE, APPARATUS FOR RESTORING CONTROL MESSAGE, METHOD OF RECONSTRUCTING CONTROL MESSAGE, AND METHOD OF RESTORING CONTROL MESSAGE

TECHNICAL FIELD

The present invention relates to an apparatus for reconstructing a control message, an apparatus for restoring a control message, a method of reconstructing a control message, and a method of restoring a control message.

BACKGROUND ART

A broadband wireless access system is a next generation communication system that supports mobility, in addition to a local area data communication system such as a known wireless LAN system that uses a fixed access point.

Various standards for the broadband wireless access system have been suggested. At present, international standardization of portable Internet is in progress on the basis of IEEE 802.16 and IEEE 802.16e-2005 standards.

The wireless LAN system based on IEEE 802.11 provides a data communication system that allows wireless communication within a short range from a fixed access point. However, the wireless LAN system only supports local area data communication in a wireless manner, not in a wired manner, while not providing mobility of a subscriber terminal.

The wireless portable Internet system that has been proposed by the IEEE 802.16 working group provides an endless data communication service by ensuring mobility even if a subscriber terminal moves from a cell that is managed by one base station to a cell that is managed by another base station.

The IEEE 802.16 and IEEE 802.16e-2005 standards basically support a metropolitan area network (MAN). The MAN is an information network that covers a larger geo-graphical area than that covered by the local area network (LAN) and the wide area network (WAN).

Accordingly, the broadband wireless access system supports a handover of a subscriber terminal, like the mobile communication service, and performs dynamic IP address allocation when the subscriber terminal moves.

A control message (or management message) that is transmitted and received between the subscriber terminal and the base station is defined by the IEEE 802.16 and IEEE 802.16e-2005 standards, and includes a plurality of parameters.

In recent years, many attempts have been made to provide various kinds of services to the subscriber terminal. Data transmission/reception between a subscriber terminal and a base station is performed through a limited radio resource. Accordingly, there is a need for reducing the size of the control message.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide an apparatus for reconstructing a control message, an apparatus for restoring a control message, and a method of reconstructing and restoring a control message, having advantages of reducing the size of a control message to be transmitted and received between a terminal and a base station.

Technical Solution

An exemplary embodiment of the present invention provides an apparatus for reconstructing a control message, the apparatus including an index parameter generating section that classifies a plurality of first parameters in a control message according to a predetermined criterion to generate group information, and generates one or more index parameters corresponding to the group information, and a control message reconstructing section that reconstructs the control message on the basis of the group information and the index parameters.

Another embodiment of the present invention provides a method of reconstructing a control message, the method including grouping one or more first parameters having the same value of first fields, each first field defining a corresponding first parameter, among a plurality of first parameters in a control message to generate group information, generating one or more index parameters including the number of first parameters in each group and the values of the first fields of the first parameters in each group, and corresponding to the groups, and reconstructing the control message on the basis of the group information and the index parameters.

Still another embodiment of the invention provides an apparatus for restoring a control message, the apparatus including an index parameter processing section that extracts the values of first fields of one or more index parameters in a first control message and assigns first field values to one or more first parameters in a group corresponding to each index parameter, and a control message restoring section that deletes the index parameters and the first parameters in the first control message, and generates a second control message including the first parameters having the assigned first field values and second parameters in the first control message.

Yet another embodiment of the invention provides a method of restoring a control message including determining whether or not a control message to be input is a first control message, and if it is determined that the control message is the first control message, searching first field values of one or more one index parameters in the first control message, assigning the searched first field values to one or more first parameters in a group corresponding to each index parameter, and deleting the index parameters and the first parameters in the control message, and generating a second control message including the first parameters having the assigned first field values and second parameters in the first control message.

Advantageous Effects

According to the embodiment of the present invention, the control message to be transmitted and received between a base station and a terminal can be reduced in size. Therefore, more data transmission/reception between the base station and the terminal can be achieved through a limited radio resource. As a result, an apparatus for reconstructing a control message, an apparatus for restoring a control message, a method of reconstructing a control message, and a method of restoring a control message that can efficiently use a limited radio resource can be implemented.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the term "comprise" and variations such as "comprises" and "comprising", when used herein, specify the presence of constituent elements, but do not preclude the presence or addition of other constituent elements. The term "section" used herein means a unit that processes at least one function or operation. The section can be implemented by hardware or a combination of hardware and software.

An apparatus for reconstructing a control message, an apparatus for restoring a control message, a method of reconstructing a control message, and a method of restoring a control message according to an exemplary embodiment of the present invention will now be described in detail with reference to the drawings.

Figure 1:
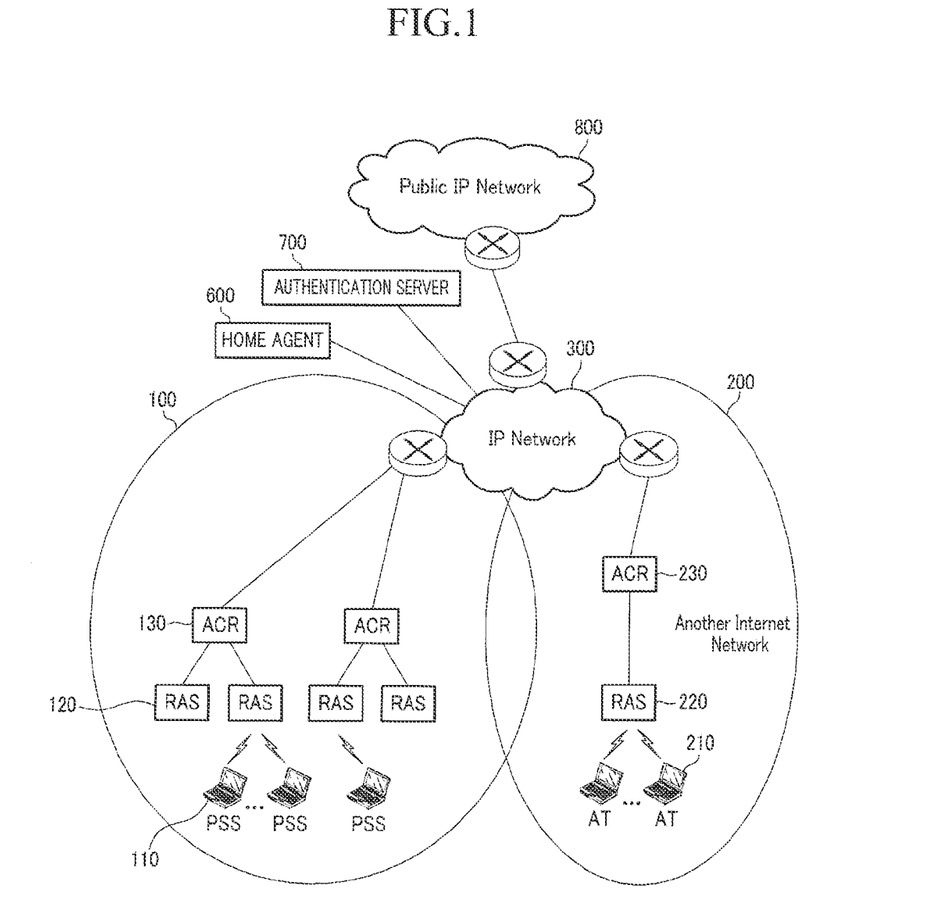
FIG. 1 is a diagram showing a broadband wireless access system according to an exemplary embodiment of the present invention.

FIG. 1 is a diagram showing a broadband wireless access system according to an exemplary embodiment of the present invention.

As shown in FIG. 1, a broadband wireless access system 100 according to an exemplary embodiment of the present invention includes terminals (PSSs, personal subscriber terminals) 110, base stations (RASs, radio access stations) 120, and routers (ACRs, access control routers) 130.

Each terminal 110 is a terminal that is used by a subscriber for a portable Internet service. The terminal 110 has mobility and performs a radio channel transmitting/receiving function according to a wireless access standard at a frequency of 2.3 GHz band to be connected to the base station 120, and transmits/receives high-rate packet data.

Each base station 120 connects the wireless network to a wired network, and directly provides a wireless packet data service to the terminal 110 through a wireless interface at a terminus of the wired network. That is, the base station 120 performs an initial access and inter-sector handover control function, and a QoS (quality of service) control function. The base station 120 receives wireless signals from the terminal 110 and transmits the received wireless signals to the router 130, or converts various kinds of information received from the router 130 into wireless signals and transmits the converted wireless signals to the terminal 110.

Each router 130 is connected to a plurality of base stations 120 and an IP-based wired network to control the terminal 110 and the base stations 120, routes IP packets, and performs a foreign agent function of a mobile IP. At this time, a single packet access router region becomes a single IP subnet. The foreign agent function refers to a user registration and cancellation function to allow movement to another service network while maintaining the Internet connection when a packet-based Internet connection and roaming service is provided.

An authentication (authentication, authorization, and accounting; AAA) server 700 is connected to the router 130 through an operator network (IP network, 300), allows only an authorized user to access an Internet network (public IP network, 800), and performs authentication on the user and the terminal 110, service authorization, and accounting, thereby providing an IP-based service. The authentication server 700 uses a diameter protocol that is being standardized by the IETF (Internet Engineer Task Force). The diameter protocol is used to transmit authentication, authorization, and accounting information through inter-server connection.

A home agent (HA) 600 performs routing to transmit packets from an external packet data service server, which includes the Internet network (public IP network, 800).

The broadband wireless access system 100 according to an exemplary embodiment of the present invention shown in FIG. 1 is connected to another broadband wireless access system 200, which is composed of terminals 210, a base station 220, and a router 230, through the operator network (IP network, 300), and is also connected to a cellular network or a wireless LAN network through the Internet network (public IP network, 800). One or more routers 130 may be provided in the same network. One or more base stations 120 may be provided under the single router 130, and a plurality of terminals 110 may be connected to the single base station 120 to use a service. In addition, when a terminal 110 moves from a cell that is managed by the base station 120 to a new cell, it can use the service that is provided by the previous cell.

Figure 2:
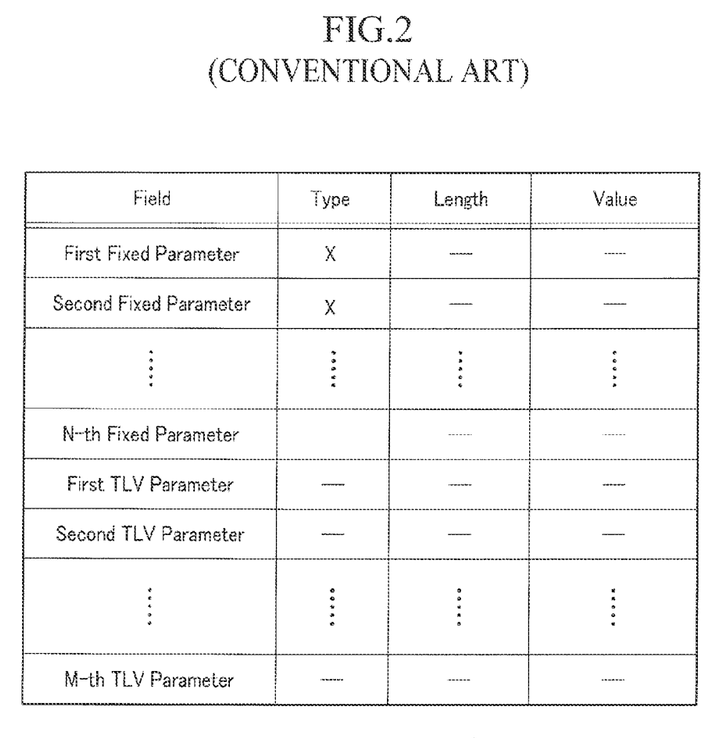
FIG. 2 is a drawing showing the structure of a general control message that is defined by the IEEE 802.16 and IEEE 802.16e-2005 standards.

FIG. 2 is a drawing showing the structure of a general control message that is defined by the IEEE 802.16 and IEEE 802.16e-2005 standards.

As shown in FIG. 2, a general control message defined by the IEEE 802.16 and IEEE 802.16e-2005 standards includes a plurality of parameters. The parameters are broadly divided into fixed parameters and TLV parameters. Here, the fixed parameters are constantly included in a corresponding control message, and the TLV parameters are added to or deleted from the control message, if necessary.

The TLV parameters are parameters that are defined by a type field, a length field, and a value field, and are expressed with the letters T, L, and V, which represent the type, length, and value, respectively. Meanwhile, unlike the TLV parameters, the fixed parameters are defined by the length field and the value field.

Hereinafter, the configuration and operation of the apparatus 400 for reconstructing a control message and the apparatus 500 for restoring a control message, which reconstructs a control message and transmits/receives the reconstructed control message, according to an exemplary embodiment of the present invention will be described with reference to FIGS. 3 to 6. For reference, each of the base stations 120 and 220 and the terminals 110 and 210 shown in FIG. 1 include the apparatus 400 for reconstructing a control message according to an exemplary embodiment of the present invention, and reconstructs and transmits the control message using the same. Each of the base stations 120 and 220 and the terminals 110 and 210 shown in FIG. 1 include the apparatus 500 for restoring a control message according to an exemplary embodiment of the present invention, and restores the reconstructed control message to the original state using the same.

Although, to transmit a control message between the base station and the terminal in a wireless manner, many steps need to be performed by a plurality of devices for wireless transmission, the devices and the steps have no relation to an exemplary embodiment of the present invention, and thus further descriptions thereof will be omitted.

Figure 3:
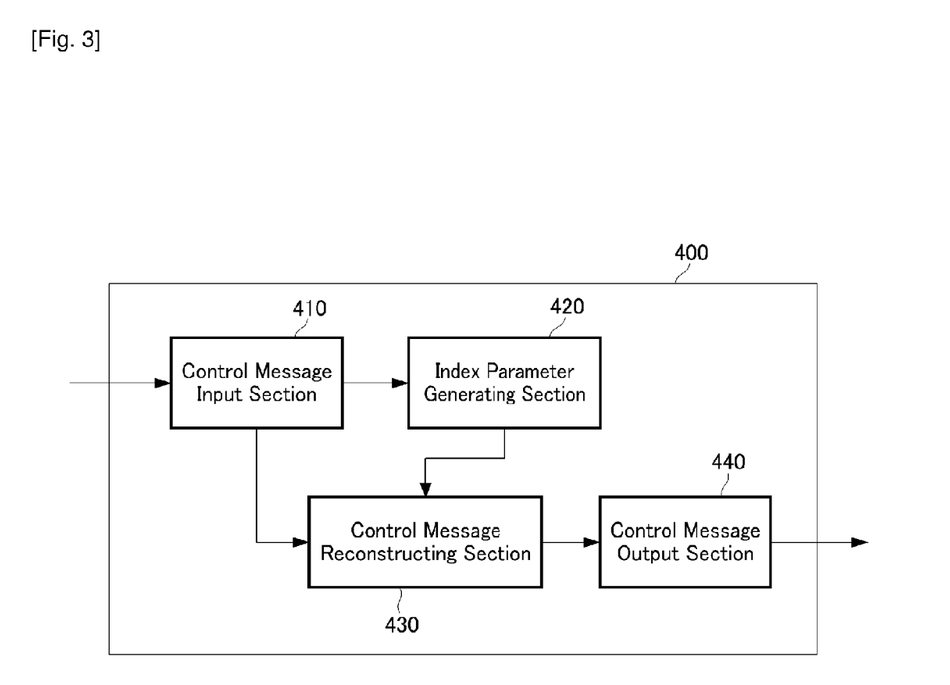
FIG. 3 is a block diagram showing an apparatus 400 for reconstructing a control message according to an exemplary embodiment of the present invention.

FIG. 3 is a block diagram showing an apparatus 400 for reconstructing a control message according to an exemplary embodiment of the present invention.

As shown in FIG. 3, the apparatus 400 for reconstructing a control message according to an exemplary embodiment of the present invention includes a control message input section 410, an index parameter generating section 420, a control message reconstructing section 430, and a control message output section 440.

The control message input section 410 receives a control message having a general structure shown in FIG. 2, and transmits the received control message to the control message reconstructing section 430 and the index parameter generating section 420.

When receiving the control message from the control message input section 410, the index parameter generating section 420 classifies all the TLV parameters in the input control message on the basis of the values of the length fields of the TLV parameters, generates TLV parameter group information and index parameters, and transmits the generated TLV parameter group information and index parameters to the control message reconstructing section 430.

Here, the TLV parameter group information is information for grouping the TLV parameters having the same length field value among all the TLV parameters in the control message. Each index parameter is generated for each TLV parameter group, and includes information on the number of TLV parameters in each TLV parameter group and the value of the length field of each of the TLV parameters in the TLV parameter group.

The control message reconstructing section 430 reconstructs the control message transmitted from the control message input section 410 on the basis of the TLV parameter group information and index parameters, which are received from the index parameter generating section 420, and transmits the reconstructed control message to the control message output section 440.

The control message output section 440 outputs the reconstructed control message, which is input from the control message reconstructing section 430, to a device for wireless transmission.

Hereinafter, the generation of the TLV parameter group information and index parameters by the index parameter generating section 420 and the reconstruction of the control message by the control message reconstructing section 430 will be described with reference to FIGS. 4 and 5.

Figure 4:
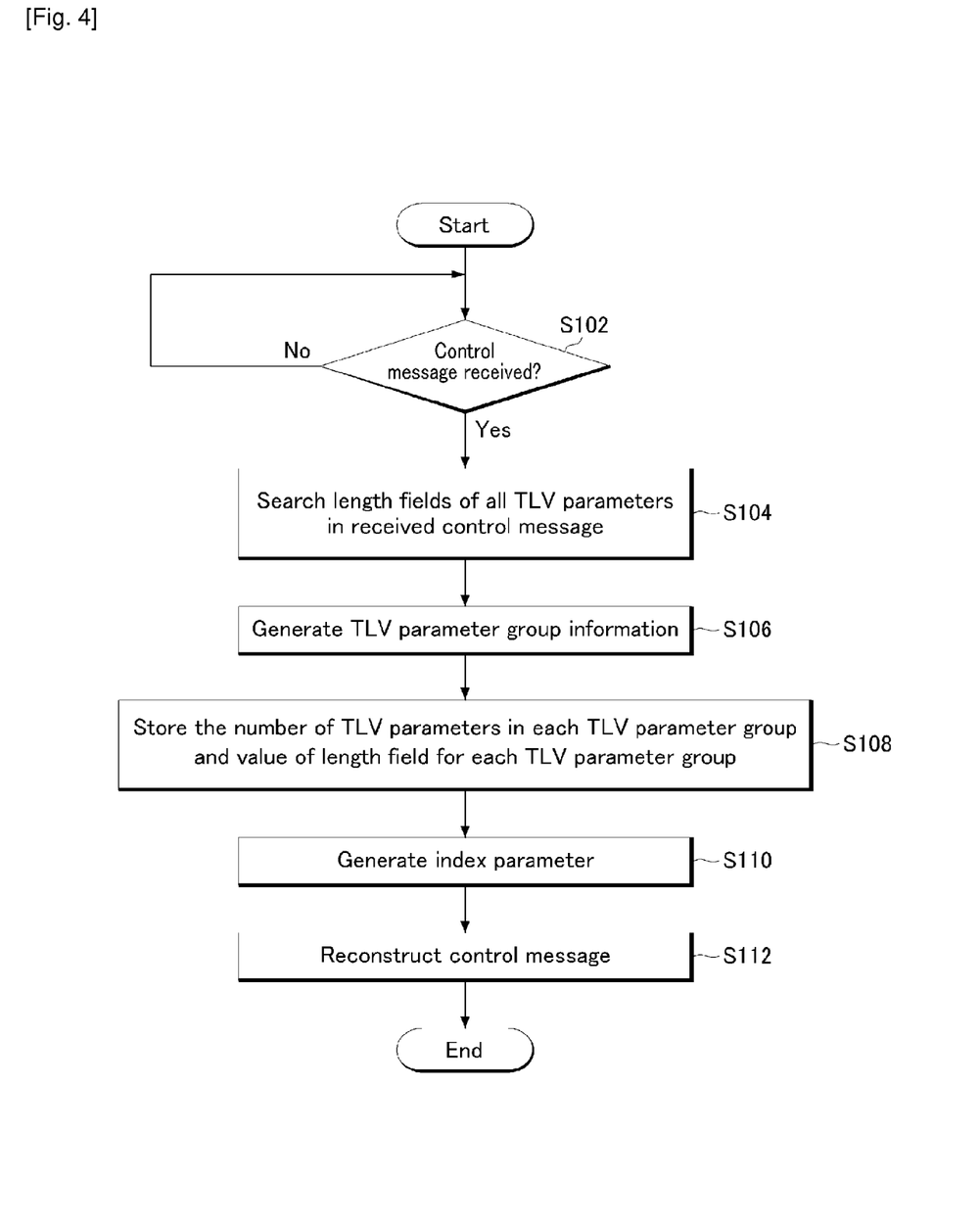
FIG. 4 is a flowchart showing a control message reconstruction procedure of the apparatus 400 for reconstructing a control message according to an exemplary embodiment of the present invention.

FIG. 4 is a flowchart showing an index parameter generation procedure of the index parameter generating section 420 according to an exemplary embodiment of the present invention.

First, the index parameter generating section 420 determines whether or not a control message is input from the control message input section 410 (step S102), and if it is determined that the control message is input, searches the length fields of all the TLV parameters in the control message (step S104).

If it is determined at step S102 that the input control message does not exist, the index parameter generating section 420 waits until the control message is input.

At step S104, the index parameter generating section 420 that searches the length fields of all the TLV parameters in the control message classifies all the TLV parameters in the control message according to the values of the length fields. The index parameter generating section 420 groups the TLV parameters having the same length field value, and generates TLV parameter group information including one or more TLV parameter groups (step S106).

The index parameter generating section 420 that performs step S106 stores the number of TLV parameters in each TLV parameter group generated at step S106 and the value of the length field of each TLV parameter group (step S108).

The index parameter generating section 420 generates an index parameter corresponding to each TLV parameter group on the basis of the information stored at step S108 (step S110).

The index parameter generating section 420 transmits the TLV parameter group information generated at step S106 and the index parameters generated at step S110 to the control message reconstructing section 430. When receiving the control message from the control message input section 410, the control message reconstructing section 430 deletes all the TLV parameters in the control message, and reconstructs the control message on the basis of the TLV parameter group information and index parameters input from the index parameter generating section 420. This will be described with reference to FIG. 5.

Figure 5:
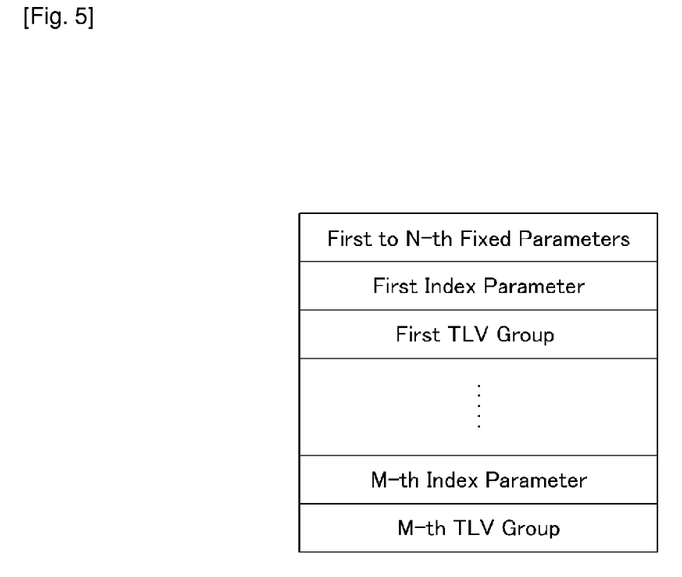
FIG. 5 is a diagram showing the structure of a control message reconstructed by a control message reconstructing section 430 according to an exemplary embodiment of the present invention.

FIG. 5 is a diagram showing the structure of a control message reconstructed by the control message reconstructing section 430 according to an exemplary embodiment of the present invention. For reference, the structure of the reconstructed control message shown in FIG. 5 is based on an assumption that the number of fixed parameters in the control message is N, and the number of index parameters generated by the index parameter generating section 420 is M.

First, since the reconstruction of the control message according to an exemplary embodiment of the present invention is related to the TLV parameters, N fixed parameters are also present in the reconstructed control message, like the structure of the general control message shown in FIG. 2. The fixed parameters are referred to as first to N-th fixed parameters.

As shown in FIG. 5, the control message reconstructed by the control message reconstructing section 430 sequentially includes first to M-th index parameters and first to M-th TLV parameter groups corresponding to the first to M-th index parameters. Here, each of the first to M-th TLV groups includes one or more TLV parameters. The TLV parameters in each TLV group have only the type field and the value field but do not have the length field information, unlike the structure of the general control message shown in FIG. 2. The length field information of each TLV group is stored in the index parameter corresponding to the TLV group. Therefore, a control message that is reconstructed by the apparatus 400 for reconstructing a control message according to an exemplary embodiment of the present invention has a smaller size than the general control message.

Hereinafter, an apparatus 500 for restoring a control message according to an exemplary embodiment of the present invention and a procedure of restoring a control message by the apparatus 500 for restoring a control message will be described with reference to FIGS. 6 and 7.

Figure 6:
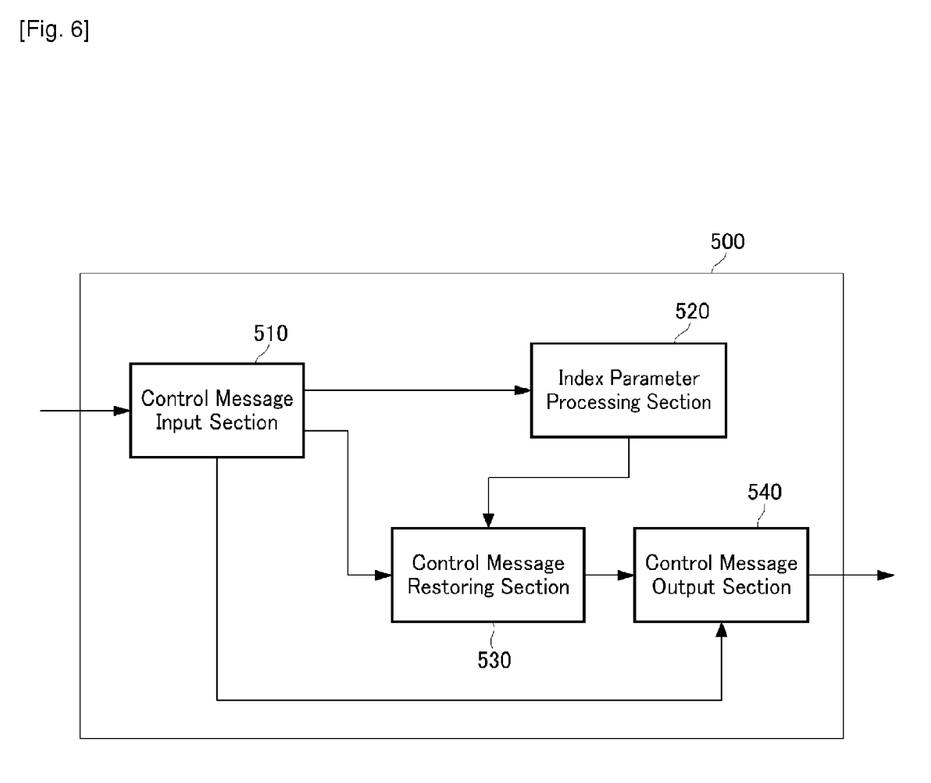
FIG. 6 is a block diagram showing an apparatus 500 for restoring a control message according to an exemplary embodiment of the present invention.

FIG. 6 is a block diagram showing an apparatus 500 for restoring a control message according to an exemplary embodiment of the present invention. Hereinafter, a description will be given based on an assumption that the apparatus 500 for restoring a control message according to an exemplary embodiment of the present invention shown in FIG. 5 receives a reconstructed control message.

As shown in FIG. 6, the apparatus 500 for restoring a control message according to an exemplary embodiment of the present invention includes a control message input section 510, an index parameter processing section 520, a control message restoring section 530, and a control message output section 540.

The control message input section 510 determines the format of an input control message, and transmits the control message to the control message output section 540 or transmits the control message to the control message restoring section 530 and the index parameter processing section 520 according to the determination result.

When receiving the reconstructed control message from the control message input section 510, the index parameter processing section 520, with reference to length field information in each of the first to M-th index parameters, assigns a length field to all the TLV parameters in a TLV parameter group corresponding to each of the first to M-th index parameters, and then transmits the TLV parameters having the length fields to the control message restoring section 530.

The control message restoring section 530 substitutes the index parameters and the TLV groups in the reconstructed control message received from the control message input section 510 with the TLV parameters including the length fields received from the index parameter processing section 520, and then transmits a restored control message to the control message output section 540.

The control message output section 540 outputs the restored control message transmitted from the control message input section 510 or the control message restoring section 530.

Hereinafter, a control message restoration procedure of the apparatus 500 for restoring a control message according to an exemplary embodiment of the present invention will be described with reference to FIG. 7.

Figure 7:
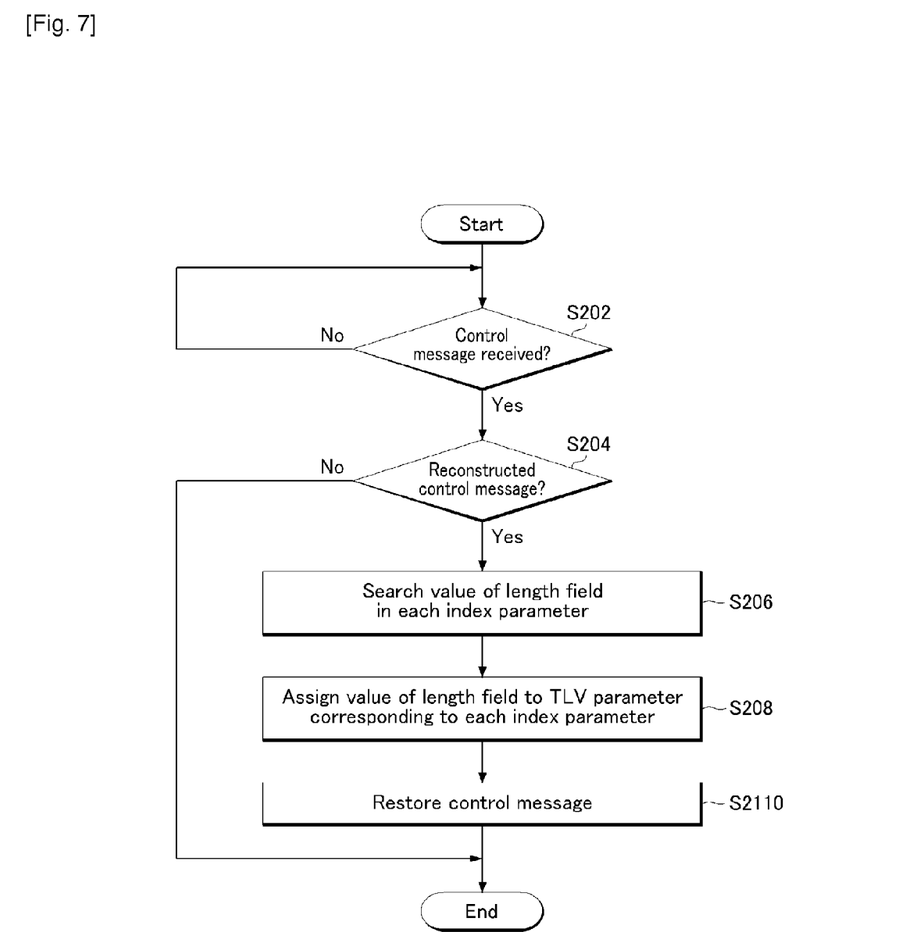
FIG. 7 is a flowchart showing a control message restoration procedure of the apparatus 500 for restoring a control message according to an exemplary embodiment of the present invention.

FIG. 7 is a flowchart showing a control message restoration procedure of the apparatus 500 for restoring a control message according to an exemplary embodiment of the present invention.

First, the control message input section 510 determines whether or not a control message is input from a wireless transmitting/receiving apparatus (step S202), and if the control message is input, determines whether or not the input control message is a control message having a format shown in FIG. 5, that is, a reconstructed control message (step S204).

If it is determined at step S102 that the input control message does not exist, the control message input section 510 waits until the control message is input.

If it is determined at step S204 that the input control message is the reconstructed control message, the control message input section 510 transmits the control message to the index parameter processing section 520 and the control message restoring section 530.

If it is determined at step S204 that the input control message is not the reconstructed control message, the control message input section 510 transmits the control message to the control message output section 540.

When receiving the control message from the control message input section 510, the index parameter processing section 520 searches the values of the length fields of individual index parameters in the control message (step S206), and assigns the value of the length field to one or more TLV parameters in the TLV parameter group corresponding to each index parameter (step S208). The index parameter processing section 520 transmits the TLV parameters having the values of the length fields to the control message restoring section 530.

The control message restoring section 530 deletes the index parameters and the TLV groups from the reconstructed control message, which is transmitted from the control message input section 510, and substitutes the index parameters and the TLV groups with the TLV parameters having the values of the length fields transmitted from the index parameter processing section 520, thereby restoring the control message having the format shown in FIG. 2 (step S210). The control message restoring section 530 transmits the restored control message to the control message output section 540.

The control message output section 540 outputs the control message transmitted from the control message input section 510 or the control message restoring section 530 to an internal data processing device.

The apparatus 500 for restoring a control message according to an exemplary embodiment of the present invention, which is described above with reference to FIGS. 6 and 7, performs different processing according to the format of the control message input through the control message input section 510. Therefore, a terminal or a base station that includes the apparatus 500 for restoring a control message according to an exemplary embodiment of the present invention can transmit/receive a control message to/from a terminal or a base station that does not include the apparatus 400 for reconstructing a control message according to an exemplary embodiment of the present invention, as well as a terminal or a base station that includes the apparatus 400 for reconstructing a control message according to an exemplary embodiment of the present invention.

The apparatus 400 for reconstructing a control message and the apparatus 500 for restoring a control message according to an exemplary embodiment of the present invention can reconstruct a control message to be transmitted and received between a base station and a terminal such that TLV parameters in the control message include only a type field and a value field, thereby reducing the size of the control message.

The exemplary embodiment of the present invention described above can not only be implemented by the method and apparatus, but it may be implemented by a program for executing the functions corresponding to the configuration of the exemplary embodiment of the present invention or a recording medium having the program recorded thereon. These implementations can be realized by the ordinarily skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the embodiment of the present invention, the control message to be transmitted and received between a base station and a terminal can be reduced in size. Therefore, more data transmission/reception between the base station and the terminal can be achieved through a limited radio resource. As a result, an apparatus for reconstructing a control message, an apparatus for restoring a control message, a method of reconstructing a control message, and a method of restoring a control message that can efficiently use a limited radio resource can be implemented.

The invention claimed is:

1. An apparatus for reconstructing a control message, the apparatus comprising:
   an index parameter generating section that classifies a plurality of first parameters in a control message according to a predetermined criterion to generate group information, and generates one or more index parameters corresponding to the group information; and
   a control message reconstructing section that reconstructs the control message on the basis of the group information and the index parameters,
   wherein the index parameter generating section classifies the plurality of first parameters on the basis of values of length fields defining the plurality of first parameters to generate the group information.

2. The apparatus of claim 1, further comprising:
   a control message input section that transmits the input control message to the index parameter generating section and the control message reconstructing section; and
   a control message output section that receives the reconstructed control message from the control message reconstructing section and transmits the received control message to a wireless transmission apparatus.

3. The apparatus of claim 1, wherein the group information is information for grouping one or more first parameters having the same value of length fields among the plurality of first parameters.

4. The apparatus of claim 3, wherein each of the one or more index parameters includes the number of first parameters in a first group, which is a group corresponding to the index parameter, and the values of the length fields of the first parameters in the first group.

5. A method of reconstructing a control message, the method comprising:
   classifying a plurality of first parameters in a control message on the basis of values of length fields defining the plurality of first parameters to generate group information;
   generating one or more index parameters including the number of first parameters included in each group and the values of the length fields of the first parameters included in each group, wherein one or more index parameters respectively corresponding to the groups; and
   reconstructing the control message on the basis of the group information and the index parameters.

6. The method of claim 5, wherein, in the reconstructing of the control message, the control message is reconstructed to include all the index parameters generated in the generating of the one or more index parameters and, between the index parameters, one or more first parameters in a group corresponding to each index parameter.

7. The method of claim 5, wherein each of the first parameters is a parameter that is defined by a type field and a value field, and the length field, and the control message further includes second parameters, each of which is defined by the type field and the value field.

8. The method of claim 7, wherein the first parameters in the reconstructed control message do not include the length field.

9. The method of claim 5, wherein the group information is information for grouping one or more first parameters having the same value of length fields among the plurality of first parameters.

10. An apparatus for restoring a control message, the apparatus comprising:
    an index parameter processing section that extracts values of first fields of one or more index parameters in a first control message and assigns first field values to one or more first parameters in a group corresponding to each index parameter; and
    a control message restoring section that deletes the index parameters and the first parameters in the first control message, and generates a second control message including the first parameters having the assigned first field values and second parameters in the first control message,
    wherein the group is a group which is generated by classifying a plurality of first parameters on the basis of values of length fields defining the plurality of first parameters.

11. The apparatus of claim 10, wherein the index parameter includes the number of first parameters in the group and the value of the length field corresponding to the group.

12. The apparatus of claim 10, further comprising:
    a control message output section that outputs the second control message to an internal data processing apparatus; and
    a control message input section that, if an input control message is the first control message, transmits the control message to the index parameter processing section and the control message restoring section, and if the input control message is the second control message, transmits the control message to the control message output section.

13. A method of restoring a control message, the method comprising:
    determining whether or not a control message to be input is a first control message;
    if it is determined that the control message is the first control message, searching first field values of one or more one index parameters in the first control message;
    assigning the searched first field values to one or more first parameters in a group corresponding to each index parameter; and
    deleting the index parameters and the first parameters in the control message, and generating a second control message including the first parameters having the assigned first field values and second parameters in the first control message,
    wherein the group is a group which is generated by classifying a plurality of first parameters on the basis of values of length fields defining the plurality of first parameters.

14. The method of claim 13, wherein, if it is determined that the control message is not the first control message, the determining, the assigning, and the deleting are omitted.

15. The method of claim 13, wherein the first control message includes:
    the second parameters;
    the one or more index parameters; and
    between the index parameters, one or more first parameters in a group corresponding to each index parameter.

16. The method of claim 15, wherein each of the first parameters is a parameter that is defined by a type field, a value field, and a length field, each of the second parameters is a parameter that is defined by the value field and the type field, and the first field is the length field.

17. The method of claim 13, wherein the first parameters in the first control message do not include the length field.

* * * * *